(12) United States Patent
Ayers et al.

(10) Patent No.: US 6,353,924 B1
(45) Date of Patent: Mar. 5, 2002

(54) METHOD FOR BACK TRACING PROGRAM EXECUTION

(75) Inventors: Andrew E. Ayers, Amherst, NH (US); Anant Agarwal, Weston; Richard Schooler, Cambridge, both of MA (US)

(73) Assignee: Incert Software Corporation, Cambridge, MA (US)

(*) Notice: Subject to any disclaimer, the term of this patent is extended or adjusted under 35 U.S.C. 154(b) by 0 days.

(21) Appl. No.: 09/246,619

(22) Filed: Feb. 8, 1999

(51) Int. Cl.[7] .............................................. G06F 9/445
(52) U.S. Cl. ......................................................... 717/4
(58) Field of Search ............................ 717/4; 704/270; 714/744; 378/23

(56) References Cited

U.S. PATENT DOCUMENTS

| 3,940,619 A | * | 2/1976 | Ellingson et al. | ............. 378/23 |
| 4,667,290 A | | 5/1987 | Goss et al. | ................. 364/300 |

(List continued on next page.)

FOREIGN PATENT DOCUMENTS

| EP | 0 286 361 | 12/1988 |
| EP | 0 372 835 A2 | 12/1988 |
| WO | WO 90/01738 | 2/1990 |

OTHER PUBLICATIONS

"Instruction Trace Apparatus. Feb. 1978," IBM Technical Disclosure Bulletin, 20(9):1–3 (Feb. 1, 1978).
Robert C. Bedichek, "Talisman: Fast and Accurate Multicomputer Simulation," 1995, Laboratory for Computer Science, Massachusetts Institute of Technology.
Robert C. Bedichek, "Some Efficient Architecture Simulation Techniques," Department of Computer Sciences, University of Washington, Usenix Conference, Jan., 1990.
Colin Hunter et al., "DOS at RISC," Byte, Nov., 1989, pp. 361–368.

(List continued on next page.)

Primary Examiner—Mark R. Powell
Assistant Examiner—Michael B. Holmes
(74) Attorney, Agent, or Firm—Hamilton, Brook, Smith & Reynolds, P.C.

(57) ABSTRACT

A method of back-tracing execution of a computer program, where the computer program comprises a plurality of blocks, comprises instrumenting an original version of the program by adding instrumentation code to some or all of the blocks to form an instrumented program. Instrumentation can be added at the binary or source level, or at link time. The instrumentation code records execution sequence information upon execution of the corresponding instrumented block to create a trace record of the executed program. The execution sequence information for each block comprises a block identifier which identifies the corresponding block. A detailed back-trace is generated, after the program has executed, by replacing each recorded block identifier with program counters associated with each instruction in the corresponding block. The application may comprise several programs or subprograms, in which case separate regions of memory can be maintained. Each region is associated with a program or subprogram or a set of programs or subprograms and stores therein part of the trace record corresponding to the associated set of programs or subprograms. The trace records themselves may be of different types. After execution, the trace record is presented to a user, in the form of assembly code, or more preferably, in the form of source level code. In an alternative embodiment, a summary of the trace record recorded during execution of an instrumented program is presented to a user. Various types of traces can be produced, including a last instruction trace and a first instruction trace.

73 Claims, 9 Drawing Sheets

U.S. PATENT DOCUMENTS

| | | | | |
|---|---|---|---|---|
| 4,951,195 | A | | 8/1990 | Fogg, Jr. et al. ............ 364/200 |
| 5,146,586 | A | | 9/1992 | Nakano ...................... 395/575 |
| 5,241,678 | A | | 8/1993 | Futamura et al. ........... 395/700 |
| 5,265,254 | A | | 11/1993 | Blasciak et al. ............ 395/700 |
| 5,321,828 | A | | 6/1994 | Phillips ....................... 703/28 |
| 5,428,786 | A | | 6/1995 | Sites ........................... 395/700 |
| 5,488,714 | A | | 1/1996 | Skidmore .................. 395/500 |
| 5,517,506 | A | * | 5/1996 | Underwood et al. ........ 714/744 |
| 5,546,586 | A | | 8/1996 | Wetmore et al. ............ 395/700 |
| 5,615,369 | A | | 3/1997 | Holler ........................ 395/709 |
| 5,634,086 | A | * | 5/1997 | Rtischev et al. ............ 704/270 |
| 5,675,803 | A | | 10/1997 | Preisler et al. .............. 395/704 |
| 5,701,487 | A | * | 12/1997 | Arbouzov ...................... 717/4 |
| 5,732,273 | A | | 3/1998 | Srivastava et al. .......... 395/704 |
| 5,732,275 | A | | 3/1998 | Kullick et al. .............. 395/712 |
| 5,764,992 | A | | 6/1998 | Kullick et al. .............. 395/712 |
| 5,790,858 | A | * | 8/1998 | Vogel ............................ 717/4 |
| 5,802,373 | A | | 9/1998 | Yates et al. ................. 395/705 |
| 5,812,855 | A | | 9/1998 | Hiranandani et al. ....... 395/709 |
| 5,870,607 | A | | 2/1999 | Netzer ........................... 717/4 |
| 5,966,541 | A | | 10/1999 | Agarwal ...................... 395/712 |
| 5,978,588 | A | | 11/1999 | Wallace ...................... 395/709 |
| 6,018,747 | A | | 1/2000 | Burns et al. ................ 707/203 |

OTHER PUBLICATIONS

Anant Agarwal et al., "ATUM: A New Technique for Capturing Address Traces Using Microcode," Proceedings of the 13th Annual Symposium on Computer Architecture, Jun. 1986.

Kazuhito, Patch System, Patent Abstract of Japan (CD–ROM), Unexamined Applications, vol. 94, No. 11 (Nov. 8, 1994).

International Business Machines Corporation, Generic Methodology for Code Patching in Binary File, 802–803 (Jun., 1998).

Ammons, G., and Larus, J., "Improving Data–flow Analysis with Path Profiles," ACM Sigplan Notices, US, Association for Computing Machinery, 33(5):72–84 (1998).

Colin Hunter, et al., "DOS at RISC," Byte, Nov. 1989, pp. 361–368.

Ferrante, J., et al., The Program Dependence Graph and Its Use in Optimization, pp. 320–349.

Johnson, R., et al., "Dependence–Based Program Analysis", pp. 78–89.

Aho, Alfred V., Compilers, Principles, Techniques, and Tools, pp. 513–580.

Ball, T. and Larus, J.R., "Optimally Profiling and Tracing Programs," Technical Report #1031, Rev. 1, Computer Sciences Department, University of Wisconsin—Madison, Sep., 1991.

Feldman, S. I. and Brown, C. B. "IGOR: a system for program debugging via reversible execution," *Proceedings of the ACM Sigplan and Sigops Workshop on Parallel and Distributed Debugging*, pp. 112–123 (1988).

Larus, J. R. "Abstract Execution: A Technique for Efficiently Tracing Programs," from *Software Practice & Experience*, GB (Chichester, John Wiley & Sons LTD.) pp. 1241–1258 (Dec. 1990).

"Productivity Tool for Online Tracing of an Assembly Listing Using a Per Trace File," *IBM Technical Disclosure Bulletin*, (Nov. 1, 1987).

\* cited by examiner

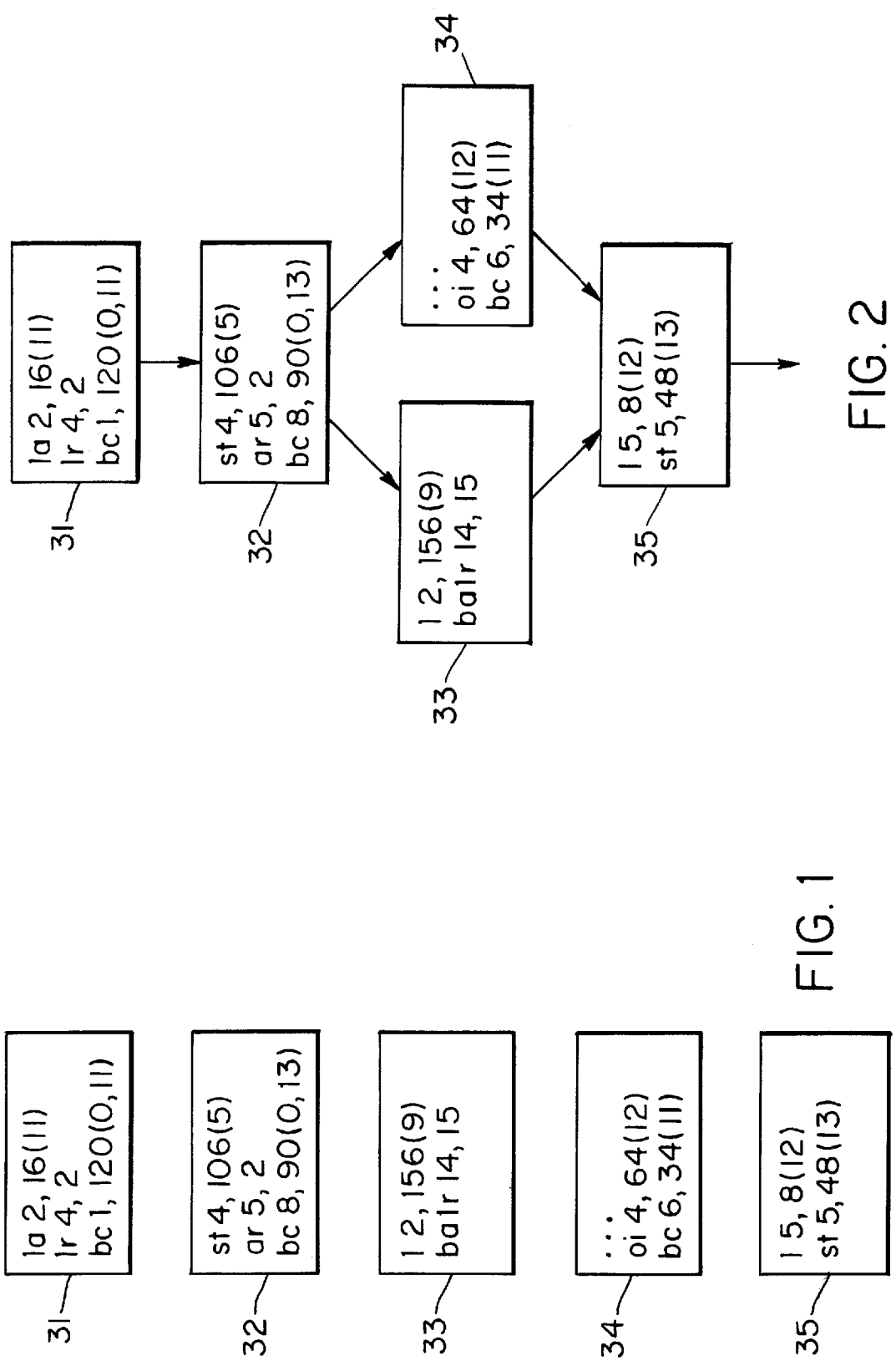

METHOD FOR BACK TRACING PROGRAM EXECUTION

BACKGROUND OF THE INVENTION

Computers are known to terminate abnormally, or crash, during program execution for many reasons, including accessing invalid memory locations, going into an infinite loop, running out of memory, accessing an invalid device, and so on. Although modern software engineering methodologies attempt to minimize the possibility of crashes, they have not been able to eliminate them.

When a computer runs an important aspect of a business, it is critical that the system be able to recover from a crash as quickly as possible, and that the cause of the crash be identified and fixed to prevent further crash occurrences, and even more importantly, to prevent the problem that caused the crash from causing other damage such as data corruption.

The first step in fixing the problem that causes a crash is to first find the problem. Finding the problem when computer crashes in production is particularly difficult because of the lack of information provided by the computer on the events leading to the crash. In modern mainframe computer environments, for example, tools exist that provide information about (1) the last instruction which executed when the computer crashed, and (2) data stored in registers and memory at the instant the crash occurred. Some of these tools also provide limited information on the sequence of subprogram calls that eventually led to the crash.

Systems such as Abend-Aid(tm) from Compuware Corp. provide only the last instruction before a crash. Abend-Aid also provides information on the state of the system when it crashed. The state includes the final values of registers and memory locations.

Where multiple programs run on a computer system and call each other, some crash-analysis systems also provide information on the call sequence. In other words, the user can obtain the sequence of inter-program calls preceding the crash.

Several packages have existed for nearly two decades that provide address traces of programs. For example, Henry, "Tracer-Address and Instruction Tracing for the VAX Architecture, " Unpublished Memo, University of California, Berkeley, November, 1984, or Agarwal, Sites, and Horowitz, "ATUM: A New Technique for Capturing Address Traces Using Microcode," In Proceedings of the 13th Annual Symposium on Computer Architecture, Pages 119–127, June 1986, or Ball and Larus, "Optimally Profiling and Tracing Programs," TR #1031, September 1991, Computer Sciences Department, University of Wisconsin-Madison. These address tracing packages focus on creating address traces of complete program runs or of sampled intervals of program runs.

These tracing packages are not concerned with computer crashes to trigger a backtrace sequence. Since their major focus is to collect complete address traces, these techniques are not concerned with the amount of storage space required to store the trace information, for example, in memory or on disk, or in being active in production execution of application programs. Tracing packages also do not provide an integrated mechanism to correlate and display traced addresses with source-level statements to facilitate debugging of computer crashes.

Isolating the reason for a crash is somewhat easier when the crash happens during program development because the program can be compiled in debug mode and executed within a debugger. Within a debugger, the program is run slowly and more information is collected than during a normal production run, so that when the program crashes the user has more information with which to diagnose the problem.

Unfortunately, it is often difficult to reproduce a crash in debug mode, because of the difficulty of faithfully reproducing within a debug environment the set of events that led to a production run crash.

Within a debugger such as "gdb," a user can stop the program at any point during its execution. Debuggers provide information on system state, such as program variable values at the halt point. By asking for a stack dump, the user can also obtain the sequence of function calls (if any) that led to the specific function within which the program is halted.

SUMMARY OF THE INVENTION

Unfortunately, existing technologies do not provide information on the specific sequence of instructions that were executed prior to the instruction that crashed or faulted. Discovering the exact sequence of instructions that executed prior to a crash is a difficult problem, made even harder when a program crashes in a production environment, because execution speed cannot be reduced significantly.

The present invention is a method for producing such a sequence of instructions, or a crash instruction trace. A crash instruction trace includes the instruction that crashed and some or all of instructions that preceded it. If the crash instruction trace contains all of the instructions executed from the start of the program to the crash point, then this sequence of instructions is called the complete crash instruction trace.

The crash instruction trace can also contain information on the specific times at which each instruction was last executed, in which case the trace is called a time-stamped crash instruction trace. The availability of a crash instruction trace can facilitate isolating the problem that caused a crash, thereby speeding up the process of crash recovery or system stabilization.

A complete crash instruction trace can become very large. For example, a computer running 100 million instructions per second will produce a 100 million instructions per second that must be recorded in a complete trace. Therefore, it is sometimes preferable to store a last instruction trace.

A last instruction trace is a sequence of instructions sorted by the last time at which an instruction was executed. A last instruction trace contains each instruction at most once. Accordingly, the maximum size of the last instruction trace is bounded by the size of the program itself.

As an example, suppose a program contains the following eight instructions, each represented as a letter: A,B,C,D,E, F,G,H. Further suppose that during a successful execution of the program the execution sequence is A, B, C, F, G, F, G, F, G, F, G, B, C, F, G, F, G, F, G, F, G, H. For the purpose of the example, assume that the program starts at precisely 1 AM and that each instruction executes in 1 microsecond ($\mu$sec).

Now, suppose the program crashes at the last execution of the statement G. Then, the trace A, B, C, F, G, F, G, F, G, F, G, B, C, F, G, F, G, F, G, F, G is the complete crash instruction trace. B, C, F, G, F, G, F, G, F, G is a partial crash instruction trace. The corresponding last crash instruction trace is A, B, C, F, G.

The time-stamped crash instruction trace is:

| Inst: | Timestamp: |
|---|---|
| A | 1AM |
| B | 1AM + 1 μsec |
| C | 1AM + 2 μsecs |
| F | 1AM + 3 μsecs |
| G | 1AM + 4 μsecs |
| F | 1AM + 5 μsecs |
| G | 1AM + 6 μsecs |
| F | 1AM + 7 μsecs |
| G | 1AM + 8 μsecs |
| F | 1AM + 9 μsecs |
| G | 1AM + 10 μsecs |
| B | 1AM + 11 μsecs |
| C | 1AM + 12 μsecs |
| F | 1AM + 13 μsecs |
| G | 1AM + 14 μsecs |
| F | 1AM + 15 μsecs |
| G | 1AM + 16 μsecs |
| F | 1AM + 17 μsecs |
| G | 1AM + 18 μsecs |
| F | 1AM + 19 μsecs |
| G | 1AM + 20 μsecs |

The last time-stamped crash instruction trace is:

| Inst.: | Timestamp: |
|---|---|
| A | 1AM |
| B | 1AM + 11 μsecs |
| C | 1AM + 12 μsecs |
| F | 1AM + 19 μsecs |
| G | 1AM + 20 μsecs |

Other types of traces, such as a first instruction trace, can also be stored. Like the last instruction trace, the first instruction trace contains only one reference to each instruction. However, unlike the last instruction trace, it stores the sequence of instructions in the order in which they were first referenced.

Instruction traces can be important for purposes other than crash recovery, such as performance tuning and debugging, in which case some system event or program event or termination condition can trigger the writing out of an instruction trace. The present invention applies to all of these event types. In this more general case, the instruction trace preceding the trace triggering event is called the pre-trigger instruction trace. If the trigger is a crash then the pre-trigger instruction trace is simply the crash instruction trace.

In accordance with the present invention, a method of back-tracing execution of a computer program, where the computer program comprises a plurality of blocks, comprises identifying the blocks of the computer program, and instrumenting an original version of the program by adding instrumentation code to some or all of the blocks to form an instrumented program. The instrumentation code records execution sequence information upon execution of the corresponding instrumented block to create a trace record of the executed program. The sequence information can be recorded, for example, in memory, or to a disk file.

Preferably, the execution sequence information for each block comprises a block identifier which identifies the corresponding block. The identifier may be, for example, a starting or ending program counter of the corresponding block, or some other assigned identifier, possibly using Huffman coding to allocate the block identifiers.

In a preferred embodiment, a detailed back-trace is generated, after the program has executed, by replacing each recorded block identifier with program counters associated with each instruction in the corresponding block.

In an optimized embodiment using path encoding, a block identifier is recorded in a condensed representation. Alternatively, a few bits can be used to encode the direction taken by the program at each branch, e.g., one bit for each two-way branch. The condensed representation can hold a plurality of block identifiers. The condensed representation can be stored, for example, in a register which reduces the number of instructions added for each block. The register value is stored into memory when no more values can be written to it. The condensed representation is then expanded by a post-processing step by storing the individual block identifiers contained therein into the trace record.

Preferably, the trace record is stored in a circular buffer, in a region of memory separate from where the program is stored, and the buffer size is dynamically set.

If the program comprises several programs or subprograms, separate regions of memory can be maintained. Each region is associated with a program or subprogram or a set of programs or subprograms and stores therein part of the trace record corresponding to the associated set of programs or subprograms, and the trace records themselves may be of different types.

Instrumentation preferably occurs at the binary level, but alternatively takes place at, for example, the source code level or at link time.

The trace record recorded is preferably presented to a user. This can be in the form of assembly code, or more preferably, is in the form of source level code. In a preferred embodiment, this is accomplished by maintaining, for each binary-level instruction, a pointer to a line of source code from which the binary-level instruction was generated. The pointer is preferably determined from a compiler listing file. In a preferred embodiment, repeat source level instructions, due for example to one line of source code leading to several lines of binary-level instructions, are filtered out. Where an application comprises many programs, the program name corresponding to an instruction trace entry is preferably displayed.

In an alternative embodiment, a summary of the trace record recorded during execution of an instrumented program is presented to a user. This can include the basic block lines identified in the trace record, as well as procedure calls identified in the trace record. The summary can also include, for example, inter-module or inter-program calls identified in the trace record.

In another preferred embodiment, a table is maintained. Each entry in the table corresponds to a program block, and is preferably addressed by a hash of its corresponding block's program counter. This table can be used to produce a last instruction trace by recording a sequence indicator when recording the block identifier, or a first instruction trace by recording a sequence indicator for a corresponding block only the first time the block is executed.

The sequence indicator can be a time-stamp, and can be recorded, for example, upon either entry or exit into the corresponding block. Alternatively, the sequence indicator can be a counter value, which, for example, increments its value after its value is recorded. In a further embodiment, when the counter value reaches a preset limit, a time-stamp is recorded in place of the counter value. A separate counter can optionally be maintained for each module, subprogram or procedure.

In another embodiment, sequence indicators are store only when a specified event, which is preferably selected by a user, is detected by the instrumentation code.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a block diagram providing an example a sequence of program basic blocks.

FIG. 2 is a control flow diagram corresponding to the example of FIG. 1.

DETAILED DESCRIPTION OF THE INVENTION

FIG. 1 shows an example instruction sequence as the instructions reside in memory. The instructions are grouped into identified blocks 31–35, where a block is a sequence of consecutive program instructions in which flow of control enters only at the beginning and leaves only at the end without halt or possibility of branching except at the end. (Aho, Sethi, and Ullman, "Compilers, Principals, Techniques and Tools," p. 528).

FIG. 2 shows a control flow graph representation of the instruction sequence of FIG. 1. For example, during execution, block 32 can be followed either by block 33 or by block 34. Thus, the static locations of blocks within the stored program as shown if FIG. 1, often do not reflect the sequence in which the blocks are executed. The goal of traceback is to provide the exact sequence in which the blocks were actually executed during an execution of the program.

Figure 3:
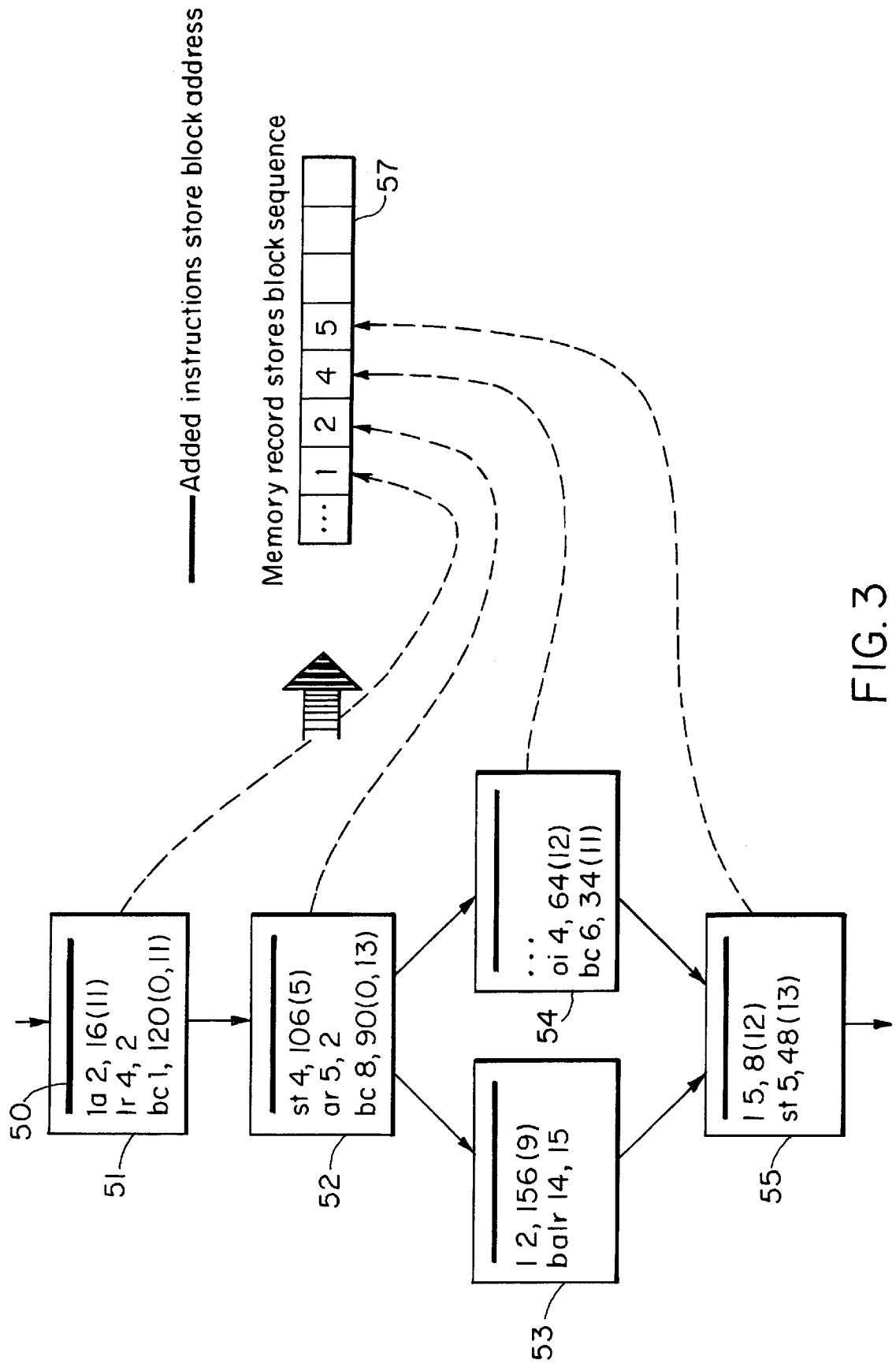
FIG. 3 is a schematic drawing showing how, in the present invention, instrumented code writes to a sequence record.

FIG. 3 demonstrates a simple embodiment of the present invention, which inserts instrumentation code, shown as thick lines, e.g., reference 50, into each block. The instrumentation code comprises one or more instructions into each block. Blocks 51–55 are the instrumented versions of blocks 31–35, respectively, of FIG. 2.

If the actual execution sequence of blocks is 51, 52, 54, 55, then as each block executes, the instrumentation code 50 in each executing block writes out an identifier of the corresponding block into a memory region explicitly created by this or other instrumentation code. The identifier may, for example, be the address of the first instruction of its block, or it may comprise some other form of identification. For example, Huffman coding may be used to allocate compact identifiers for each block with a program or within a subprogram.

In the current example, the identifiers are 1, 2, 4 and 5, corresponding to blocks 51, 52, 54 and 55 respectively. This sequence of block identifiers comprises the sequence record 57.

In a preferred embodiment, the memory region is organized as a circular buffer, which is visible to the entire program. Upon entering a basic block, the basic block's instrumentation code obtains the address of the first instruction of the basic block. Alternatively, a unique identifier may be assigned to each block via a table or some other means, and the instrumentation code obtains the identifier. The address or identifier is then written into the circular buffer.

The buffer size limits the amount of traceback history that the program can achieve. Preferably, this limit can be set dynamically by the user.

Figure 4:
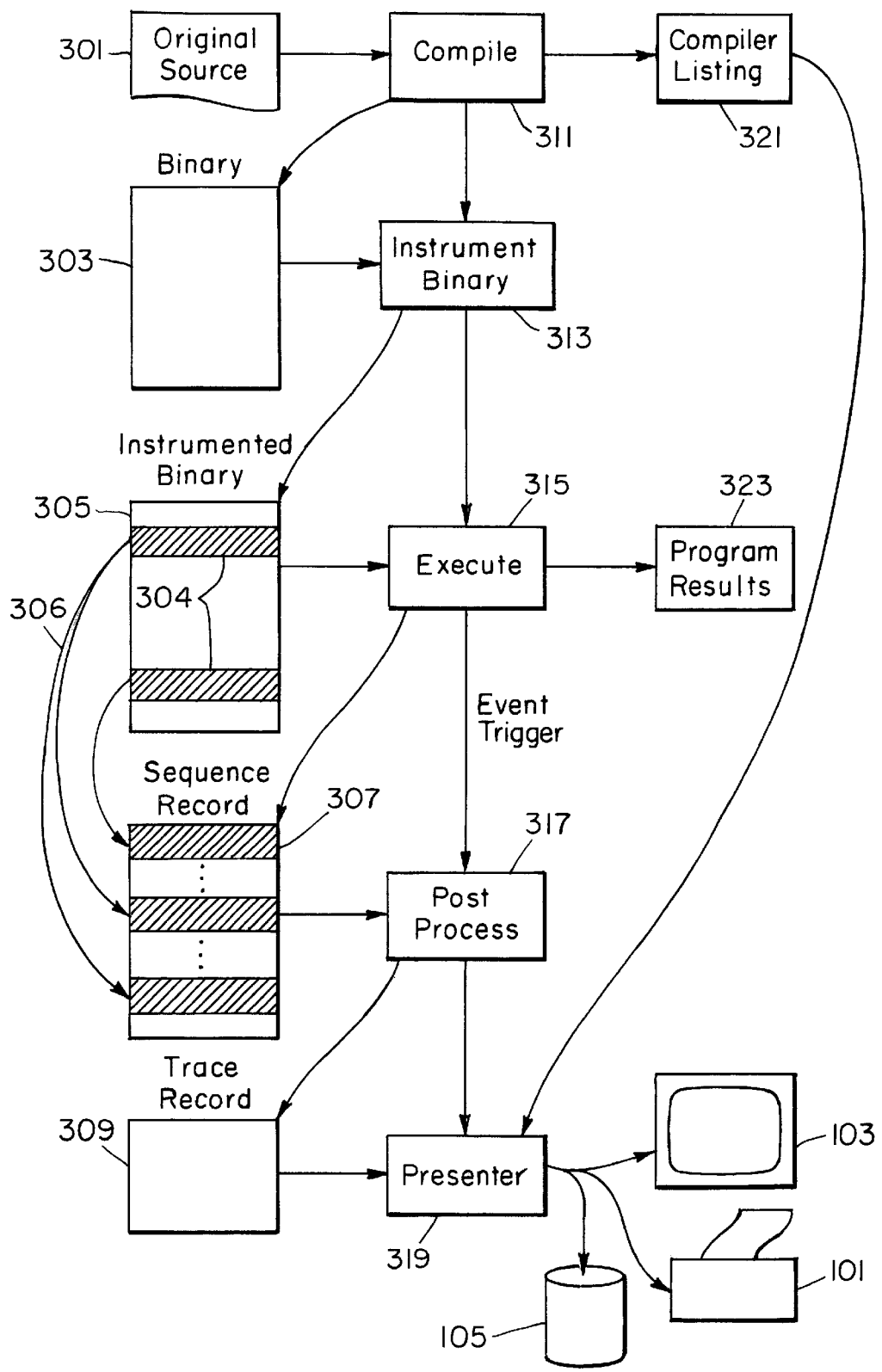
FIG. 4 is a flowchart of an embodiment of the present invention in which binary code is instrumented.

FIG. 4 illustrates a preferred embodiment of the present invention. Generally, if original source code 301 is available, it is compiled at step 311. The compiler typically provides an executable binary or object program 303, and a compiler listing 321, which provides a map from source code lines to the binary code. Obviously, if the source program is not available, step 311 is skipped and no compiler listing 321 is available.

Whether the source program is available or not, the binary image 303 is instrumented at step 313, which produces an instrumented binary 305. The instrumented binary 305 includes the added instrumentation code in each block, two of which 304 are shown. Adding instrumentation to an original program at the binary level, is described in U.S. application Ser. No. 08/985,052, "Test, Protection, and Repair Through Binary-Code Augmentation," filed Dec. 4, 1997, which is incorporated by reference herein.

When the instrumented binary program 305 is executed at step 315, the same results 323 are produced as would be with an uninstrumented program. In addition, as the program executes, the instrumentation code 304 records, or writes out, into a separate region of memory a sequence record 307 comprising sequence information, e.g., corresponding block identifiers, as indicated by arrows 306.

In a preferred embodiment, the sequence record 307 is post-processed at step 317 such that each entry representing a basic block is replaced with the set of program counters (PCs) in the block, thereby producing the desired trace record 309.

A presenter 319 then presents the trace record 309 to a user, for example, by presentation on a monitor 103, or sending the record to a printer 101 or to a disk file 105 for later analysis. If the compiler listing 321 is available, source code corresponding to the PCs can be displayed.

Figure 5:
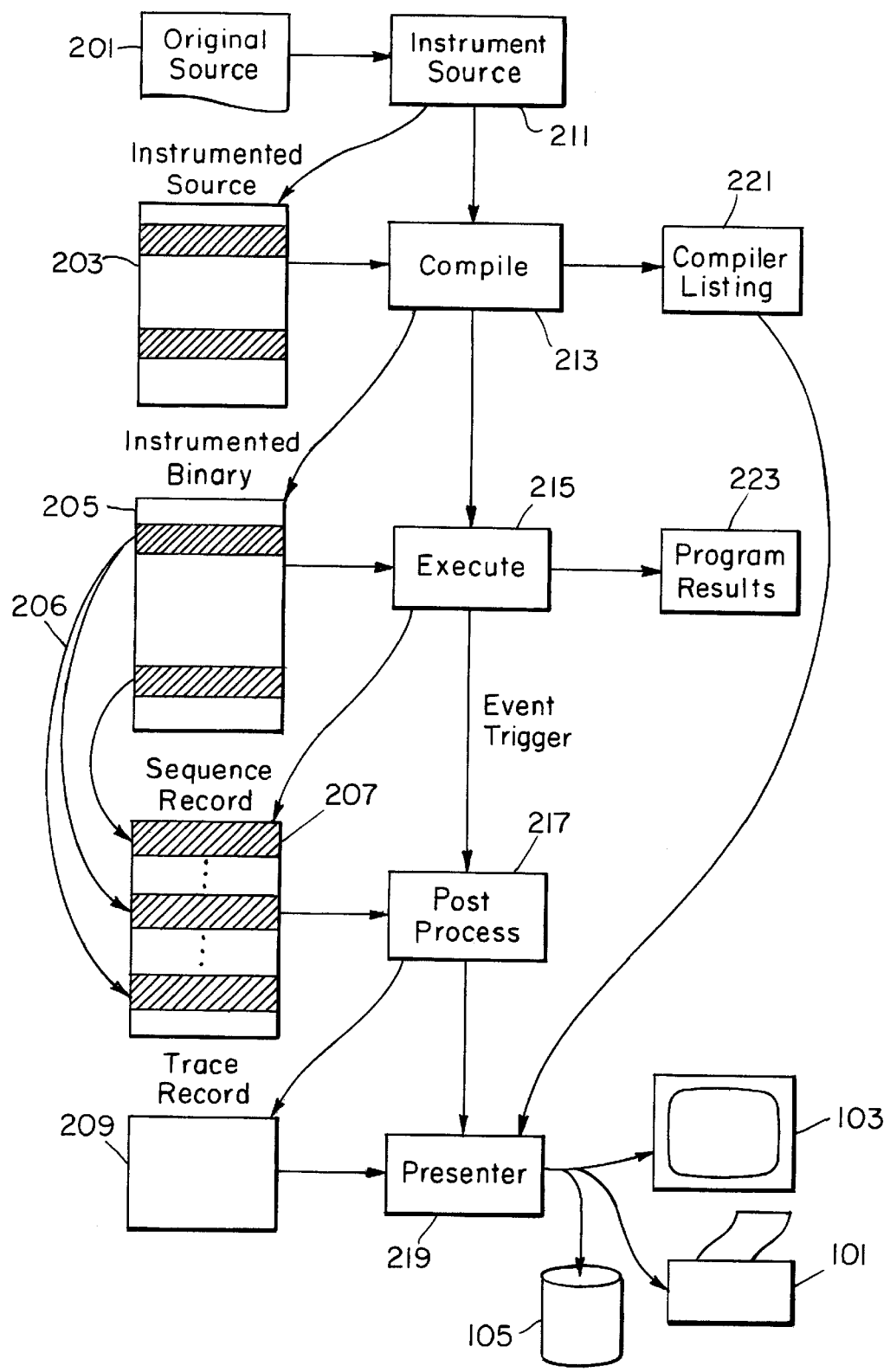
FIG. 5 is a flowchart of an embodiment of the present invention in which source code is instrumented.

As FIG. 5 shows, if source code 201 is available, then alternatively, the instrumentation can be made at the source-level, at step 211. In this case, source level recording statements are added to the program, for example, in C or Cobol. The resulting instrumented source program 203 is then compiled at step 213, producing both a compiler listing 221 and an instrumented binary 205. As in FIG. 4, the instrumented binary 205 is executed 215, producing both normal program results 223 and a sequence record 207 written, as indicated by arrows 206, by the instrumentation code 205. The post process step 217, trace record 209, presenter 219, monitor 103, printer 101 and disk storage 105 correspond to the same features of FIG. 4.

The post processor 217 (FIG. 5), 317 (FIG. 4) is preferably triggered by some event such as a crash, or some other user-defined event. Alternatively, instrumentation inserted into the program detects some designated condition defining an event, e.g., a negative value in a register when a positive value is expected.

Other instrumentation methods such as link-time instrumentation may alternatively be used.

Binary code instrumentation can be viewed as an enabler of crash instruction trace technology because it adds little overhead to the code and does not require the availability of the program sources. Not surprisingly, it is the preferred method for the current invention, because the low overhead enables trace instrumentation to be introduced in a production environment.

Therefore, in the following discussion of the traceback technology, binary code instrumentation is the assumed means of inserting the recording instructions. However, it is understood that source-level instrumentation or link-level instrumentation can be used to achieve the same goal if desired.

In a preferred embodiment, the instrumentation code creates or allocates a memory region in which to store the trace or sequence information. Where an application comprises more than one program or subprogram, the instrumentation preferably creates a memory region for each program or subprogram in which each program or subprogram respectively stores its corresponding trace information. In this manner, the traces of each program or subprogram remain untangled.

In optimizations of the present invention, it is not necessary to insert instrumentation into each block. Optimization methods followed by post processing can be used to eliminate instrumentation in many blocks.

Figure 6B:
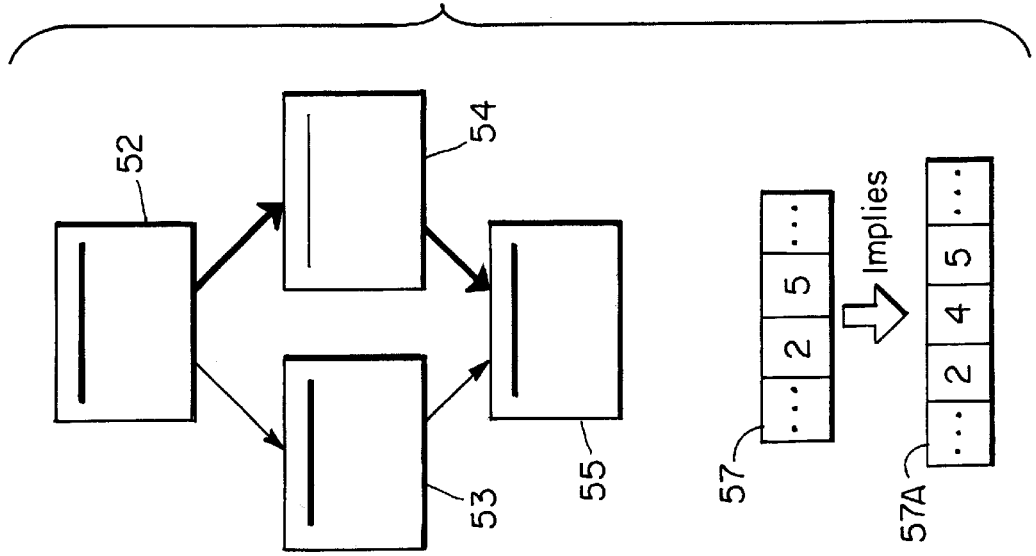
FIGS. 6A and 6B are block diagrams providing an example using of an optimization of the present invention used to eliminate instrumentation in many blocks.
Figure 6A:
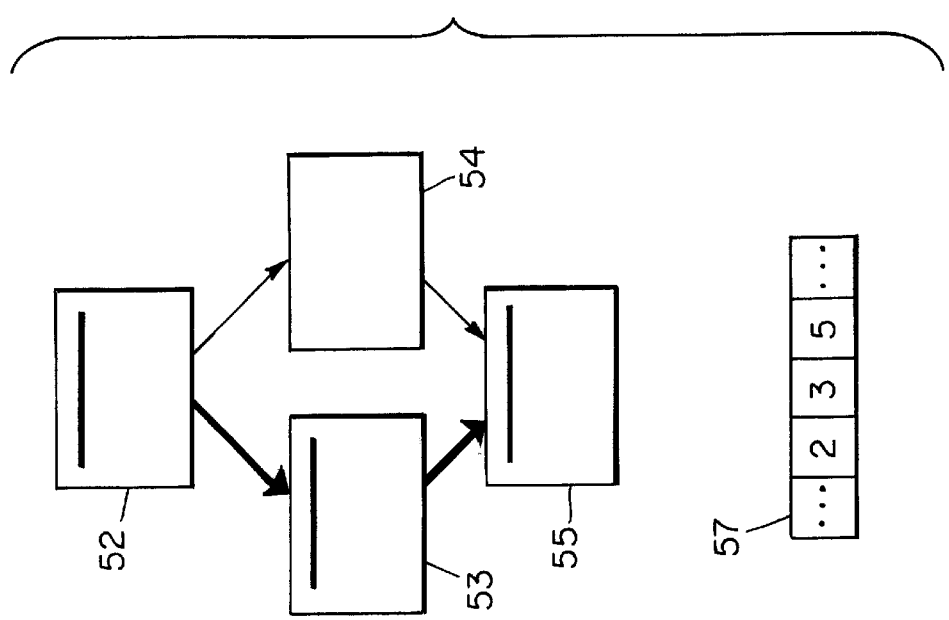

FIGS. 6A and 6B provide such an example using blocks 52–55. Here, execution of a block 52 may be followed by execution of either block 53 or block 54. Both blocks 53 and 54 are always followed by block 55. Only one of blocks 53 or 54 need be instrumented. Here, for example, blocks 52, 53 and 55 are instrumented, while block 54 is not instrumented. If, in FIG. 6A, block 53 executes as indicated by the heavy lines, the sequence record 57 written by the instrumented blocks will contain the identifiers 2, 3, 5 corresponding to blocks 52, 53 and 55.

On the other hand, if block 54 executes as in FIG. 6B, because block 54 is not instrumented, the sequence record 57 will contain only the identifiers 2, 3. Because block 53 is not seen to follow block 52 in the sequence record 57, block 54 must have executed, implying a sequence record as shown at 57A which includes the identifier 4 corresponding to block 54, although the sequence 57A is never actually stored. If the instrumentation program knows that the sequence 52, 54, 55 is more common, then it will choose to instrument block 53 and not 54.

Figure 7:
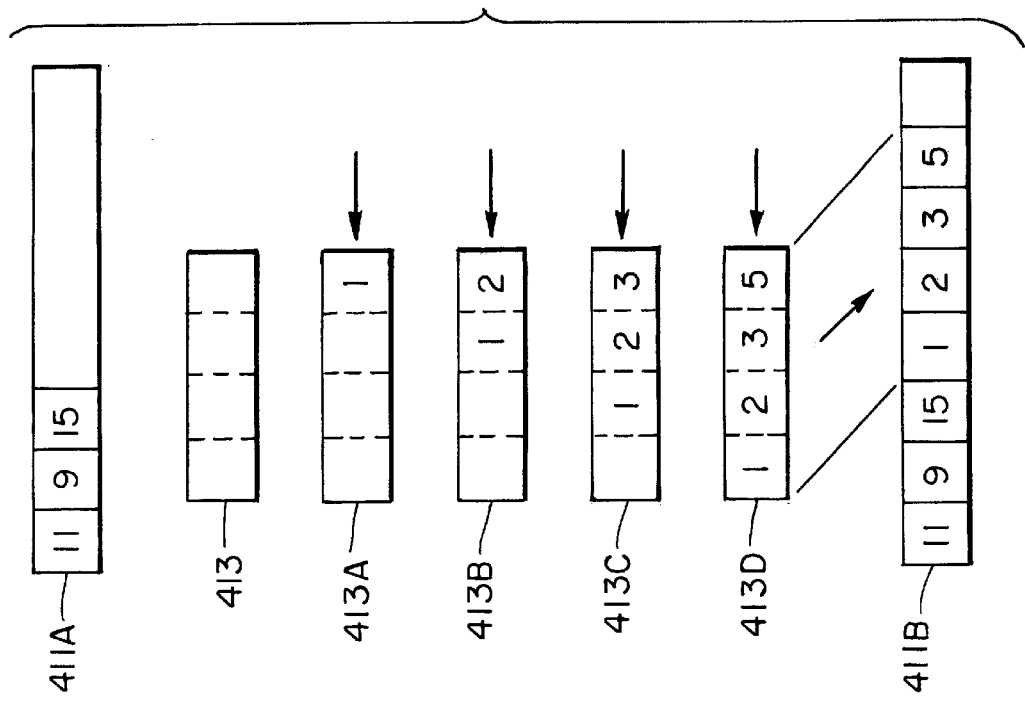
FIG. 7 is a schematic drawing showing an optimized embodiment of the present invention in which identifiers are temporarily stored, in a condensed format, in a register or memory location.

FIG. 7 demonstrates another optimization, which uses path encoding, in which a condensed representation of a sub-sequence is maintained in a register or memory location 413.

The program control flow graph is first split up into a preferably minimal set of unique single-entry multiple-exit DAGs (directed acyclic graphs), using standard techniques, for example, by using depth first search and marking to identify backedges, and then using each backedge in addition to the graph entry points as DAG headers. Each DAG is assigned a unique code word or identifier.

The instrumented code of each block within a DAG can perform a quick operation on a register or memory location such as appending or adding its identifier. If a register is used, then after several such operations, the accumulated encoding can be written out to the trace record in memory.

For example, assume that the sequence record during some execution is currently as shown at 411A. Suppose also that register 413, which in this example comprises four bytes, is clear. Referring to the control flow diagram of FIG. 3, assume the sequence of executed blocks is: 51, 52, 53, 55. As each block is executed, the instrumentation code shifts or ORs the corresponding identifier into the register 413, resulting in the sequential configurations, or path codes, shown at 413A–413D for blocks 51, 52, 53 and 55 respectively. When the instrumentation code sees that the register 413 is full, it stores all the contents of the register 413, i.e., the four identifiers, into the sequence record, so that the sequence record is as shown at 411B.

An alternate encoding scheme assigns an integer weight to each block or control-flow edge between blocks, so that each possible path within the DAG produces a unique sum, as described by Ball and Larus, in "Efficient Path Profiling," Proceedings of Micro-29, 1996. The instrumentation for each block or edge adds in its weight. A preferred implementation of this scheme chooses power-of-two weights, so that adding in a weight is accomplished by setting a single bit, for example with a single logical-OR instruction.

Alternatively, a few bits can be used to encode the direction taken by the program at each branch, for example, one bit for a two-way branch, or two bits for a three- or four-way branch Of course, depending on the size of the register or memory location, the size of the identifiers, and the method used, e.g., shifting, adding, etc., the number of identifiers temporarily stored in the register or memory may be different.

The register and the unique DAG code is stored to memory at each exit point of the DAG. Together, the DAG code and the path code within the DAG uniquely identify the dynamic program flow. If the path code word is maintained in memory, an OR immediate instruction, if available, can be used to maintain the path code directly in memory, thereby avoiding having to store the register in memory when the DAG is exited.

As discussed with reference to FIGS. 3 and 4, the trace record can be presented to a user as a sequence of binary instructions or their assembly language representations, or mnemonics. However, since each source program line of code is converted by a compiler to one or more lines of binary code, an instruction trace can also be presented to the user in source form to facilitate debugging by a user.

Figure 8:
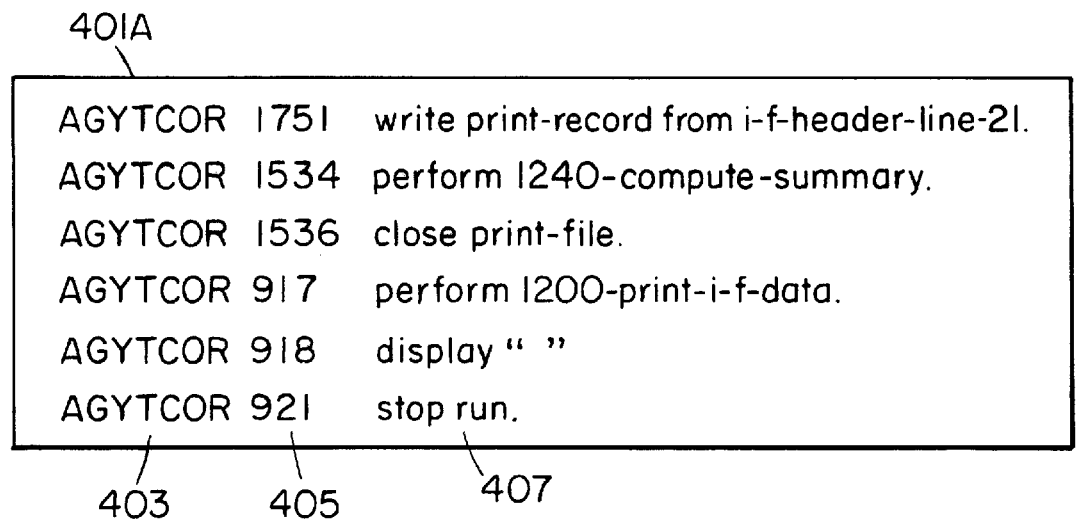
FIG. 8 is a sample trace listing presenting source code.

FIG. 8 shows a sample source code trace listing 401A, comprising three columns. The first column 403 shows the name of the program, sub-program or subroutine. The second column 405 shows the line number of the corresponding code, and the third column shows the actual source code from which the binary code was produced.

Figure 9:
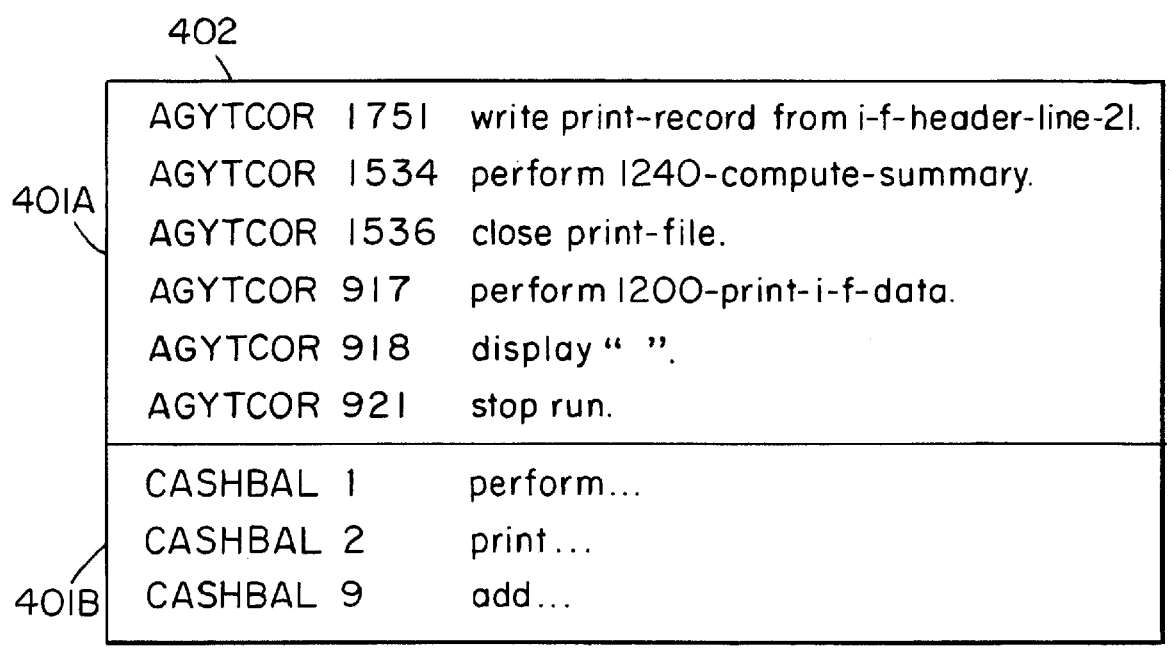
FIG. 9 is a sample trace listing presenting source code from multiple sub-programs.

FIG. 9 illustrates a similar sample source code trace listing 402, produced by a preferred embodiment which is useful when multiple programs are running, i.e. where an application comprises several programs. If buffers are allocated to each subprogram and to each program, using either time-stamps or sequence numbers or both, then the postprocessor displays a crash or event instruction trace which includes three pieces of information per line of code: the program name, the line number, and the specific source.

In the example of FIG. 9, the traces of two programs (subprograms), AGYTCOR and CASHBAL are shown. The first part 401A, corresponds to the trace 401A of FIG. 8 and corresponds to the program AGYTCOR. The second part 401B shows the trace for the program CASHBAL.

Presentation of source code to the user is accomplished, for example, by maintaining for each binary/assembly instruction, a pointer to the source line that produced the instruction. There are many ways in which this information can be obtained. Most commonly, compilers produce such information. Compiler listing files also commonly contain the source code lines and the corresponding binary code lines. Prior to displaying the trace to a user, a post-processing step can convert each line of binary code or assembly code to the corresponding source statement.

Typically, multiple assembly instructions map to a single source statement. Thus, the source level trace may show the same source instruction repeated. A further optimized embodiment of the present invention therefore filters out repeat source level instructions, for example, by replacing multiple identical source lines in the trace display with a single line.

In addition to assembly or source code line traces, a preferred embodiment optionally presents summary trace information to the user. Such summary information may comprise, for example, basic block lines, procedure calls or inter module/program calls.

With small modifications, the present invention can produce other types of traces, as now discussed.

Figure 10A:
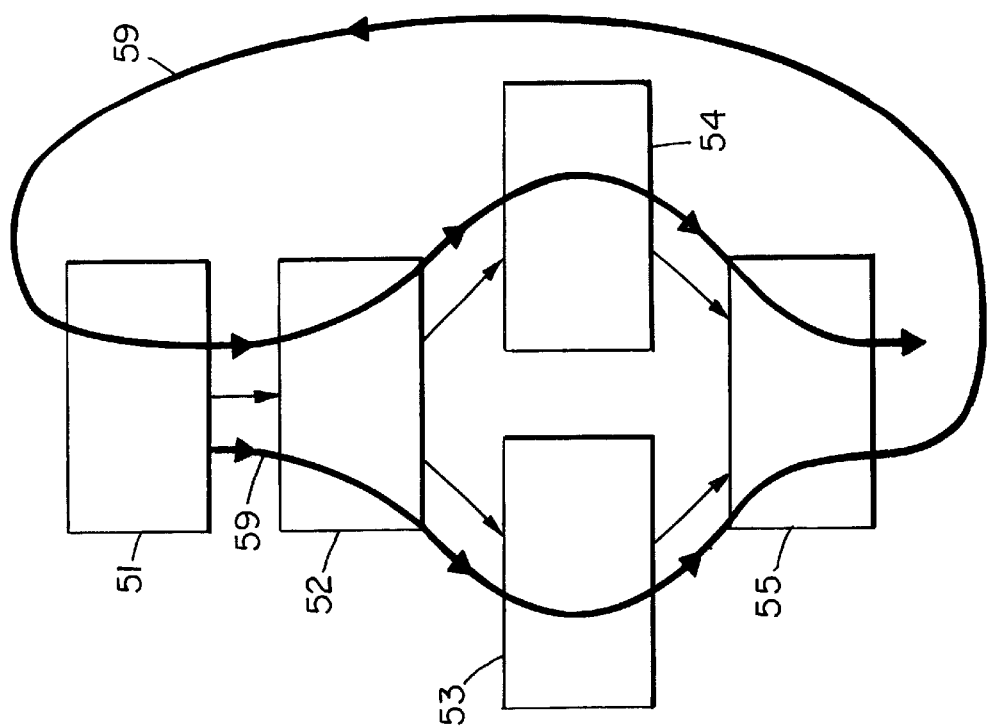
FIGS. 10A–10C are schematic diagrams illustrating embodiments of the present invention create a last instruction trace (FIG. 10B) and a first instruction trace (FIG. 10C) for the control flow shown in FIG. 10A.
Figure 10B:
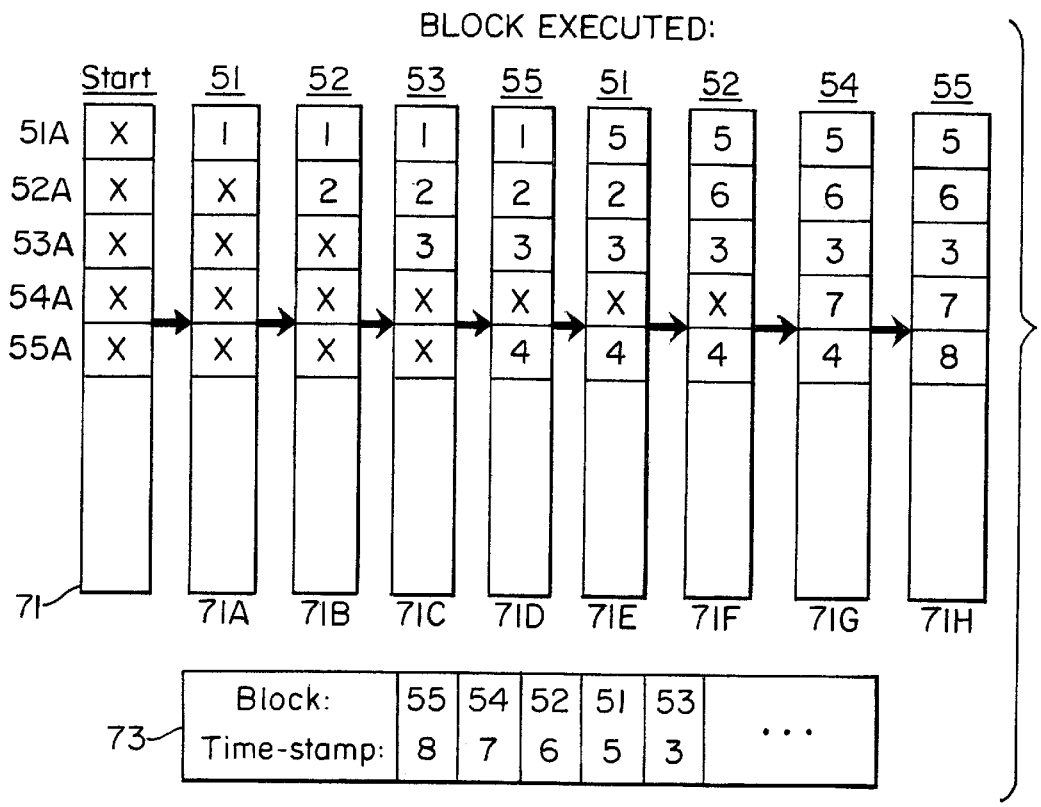
Figure 10C:
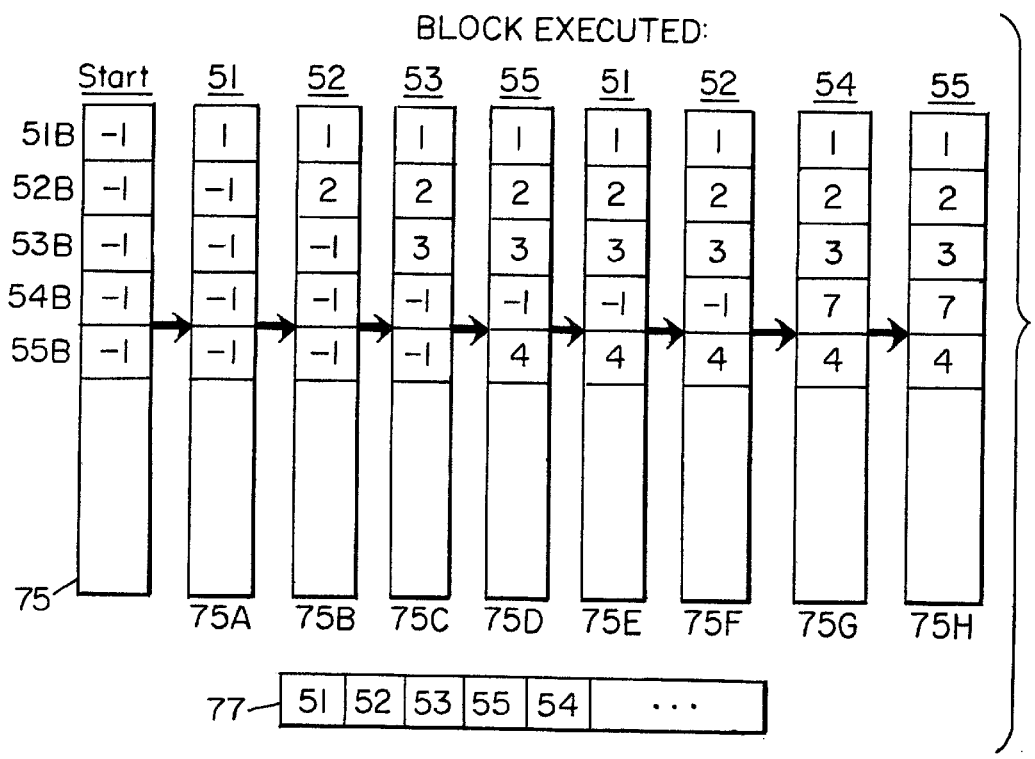

FIGS. 10A–10C demonstrate how alternative embodiments of the present invention can create a variety of traces such as a "last instruction trace" and a "first instruction trace." The control flow graph of FIG. 10A corresponds to that of FIG. 3. For the examples of FIG. 10B and 10C, assume the control flow indicated by the heavy line 59. Thus, the order of execution of the blocks is: 51, 52, 53, 55, 51, 52, 54, 55.

FIG. 10B illustrates a preferred manner of creating a last instruction trace. For example, a table 71 is maintained wherein each entry 51A–55A is associated with a specific corresponding block 51–55, respectively. When a block is executed, a timestamp is recorded in the memory buffer at the corresponding location.

At the start of the program, each entry is marked with an X to indicate the corresponding block has not yet executed. After block 51 executes, the timestamp, here a 1, is stored into the corresponding location 51A, as indicated at 71A. Similarly, after blocks 52 and 53 execute, timestamps indicating the respective times of execution, here 2 and 3, are stored in the corresponding locations 52A and 53A, as indicated at 71B and 71C respectively.

71A–71H show the changes to the table 71 as each block is executed. Note that, for example, at 71E, when block 51 executes a second time, the new timestamp, here a 5, overwrites the old timestamp.

After execution of the program, or upon some triggering event such as a system crash, the post-processor writes out the sequence record 73. By ordering the timestamps in reverse order, the blocks are ordered by last execution, and only the last execution of each block is shown. Thus, this is a last instruction trace. Of course, the blocks could also be ordered from first to last, however this is still a last instruction trace.

In an improved embodiment, hashing techniques can be used in combination with the block addresses to identify corresponding locations within the table.

There are many ways in which a time-stamp can be obtained, one being the use of a system call to retrieve the value in the system clock. In a preferred embodiment, each writing of the time-stamp writes over the previous value stored in the entry corresponding to the block, although in other types of traces may not be desired.

FIG. 10C demonstrates an alternative embodiment which produces a "first instruction trace," in which the first execution of a block is recorded. A buffer 75 is allocated, having an entry 51B–55B corresponding to each block 51–55 in the program. Each entry is initialized to some known value such as −1. When a block is executed, a time-stamp is recorded only if the current value in the record is −1. Otherwise no value is recorded.

As with FIG. 10B, 75A–75H depict the state of the table 75 as each block is executed. After the program runs, the blocks are ordered into a sequence record 77 by time-stamps. Because only first execution times are recorded, the resulting trace is a first instruction trace.

In a preferred embodiment, any or all of a crash instruction trace, a first instruction trace and a last instruction trace can be stored The circular buffer approach can be combined with other trace methods, such as the first or last instruction trace. This combination is valuable when, for example, the user wants a very long instruction trace. A small loop in one of the program modules, subprograms, or procedures can completely fill up the buffer. Instead, it is preferable to store sequences related to each program module in a separate buffer such that memory is allocated as and when each module executed.

Figure 11:
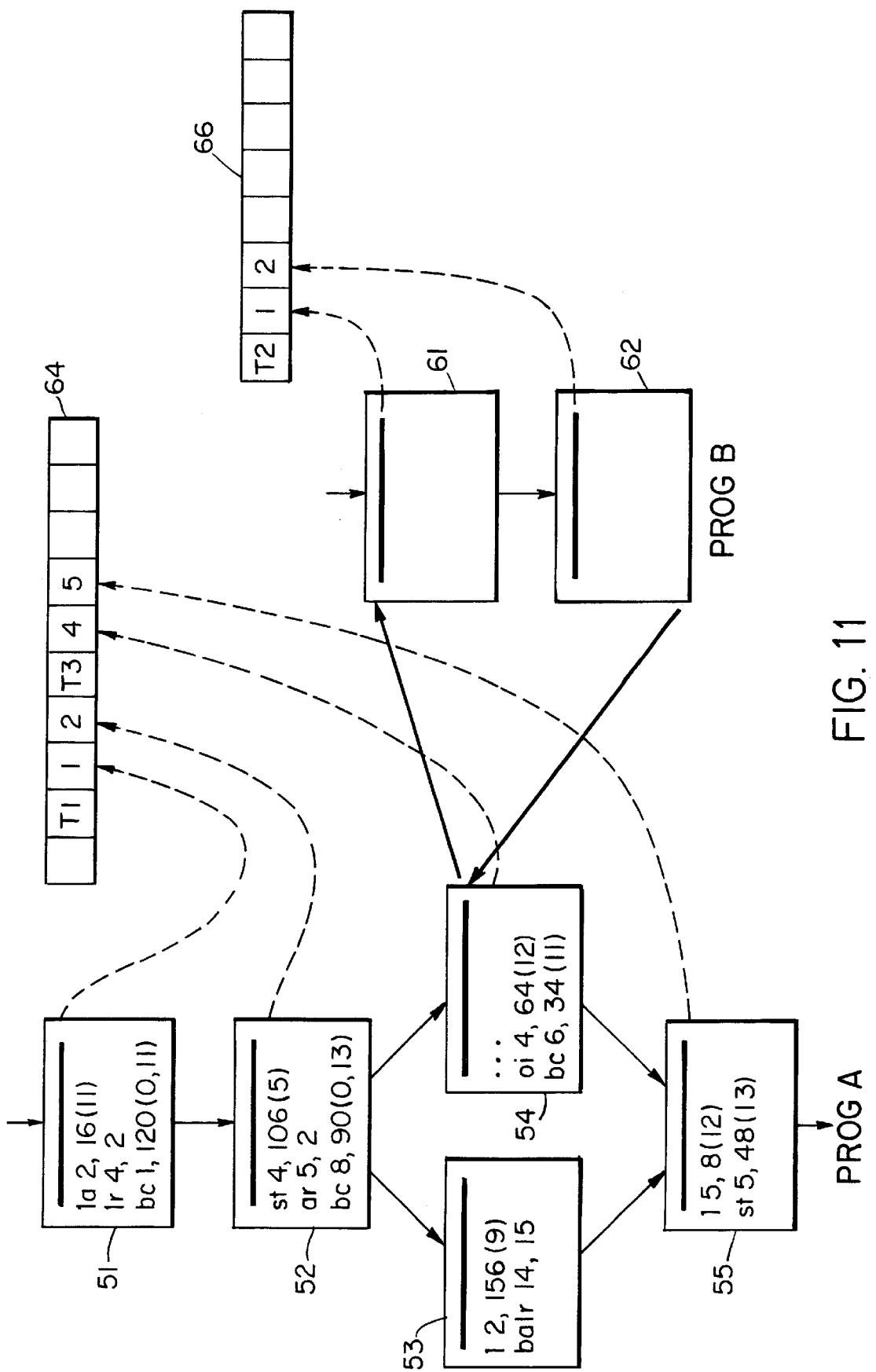
FIG. 11 is a schematic drawing showing how a preferred embodiment of the present invention operates with multiple programs, each having its own buffer.

Preferably, as FIG. 11 illustrates, a circular buffer 64, 66 is allocated to each module, ProgA and ProgB respectively. Instrumentation at the beginning of a module creates the module-specific buffer. At the start of the module execution, the instrumentation code records the current time. For example, the instrumentation code of block 51 records time-stamp T1. Then, as before, the block instructions or identifiers 1 and 2, corresponding to blocks 51 and 52, are recorded.

Now blocks 61 and 62 from module ProgB are called and executed before block 54. The instrumentation code from block 61 writes a time-stamp T2 into ProgB's buffer 66, and then blocks 61 and 62 write their identifiers 1 and 2 into the buffer 66. After block 62, control returns to block 54 in ProgA, which writes a new time-stamp T3 into ProgA's buffer 64. Alternatively, time-stamps can be stored upon each exit, or on both entry and exit. Time-stamps can also be written by the runtime system.

Note that the sequence records 64, 66 need not be the same type. For example, record 64 may record every execution of every block of ProgA, while record 66 may be a last instruction trace.

In an another alternative embodiment, a circular buffer represents only module entries and/or exits. Thus, when a module is entered and/or exited, corresponding, for example, to a call and/or return, the instrumentation writes the module identifier into this module-level circular buffer. A record of the executed module sequence is thus recorded. The complete history is then obtained by combining the module-level trace with the intra-module traces obtained within the circular buffer.

Alternatively, rather than using clock functions which may be expensive in terms of time or other resources, a global sequence number or counter is maintained in a register or in memory. Each time the value of the counter is written into the sequence record, the counter is incremented. Alternative embodiments can also have counters allocated for program modules, subprograms, and procedures.

If such a counter is incremented frequently, it may overflow. Of course, overflows can be handled in many ways. A preferred method is to resort to using a time-stamp when a counter reaches a preset high limit.

Preferably, a buffer is written out or displayed when the instrumentation detects some event. The event is chosen by the user and special instrumentation instructions are inserted to check for the user specified condition. When the condition is met, the buffer is written out. Different events can be assigned to trigger different buffers.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of back-tracing execution of a computer program, said computer program comprising a plurality of blocks, said method comprising:

identifying the blocks of the computer program;

instrumenting an original version of the program by adding instrumentation code to identified blocks to form an instrumented program, the instrumentation code recording execution sequence information upon execution of the corresponding instrumented block, such that cumulative sequence information recorded during execution of the program forms a sequence record;

recording a sequence record of the program by executing the instrumented program; and upon occurrence of a triggering event, processing the recorded sequence record to form a trace record, wherein sequence information in the recorded sequence record is translated into at least one program counter value of an instruction within an instrumented block whose execution caused the sequence information to be recorded.

2. The method of claim 1 wherein the execution sequence information for each instrumented block comprises a block identifier which identifies the corresponding block.

3. The method of claim 2 wherein a block identifier is a starting program counter of the corresponding block.

4. The method of claim 1 wherein every block is instrumented.

5. The method of claim 2 wherein processing the sequence record comprises:

replacing each recorded block identifier with program counters associated with each instruction in the corresponding block.

6. The method of claim 2 further comprising:

using Huffman coding to allocate block identifiers.

7. The method of claim 2, further comprising:

recording a block identifier in a condensed representation, wherein the condensed representation holds a plurality of block identifiers.

8. The method of claim 7, wherein the condensed representation is stored in a register.

9. The method of claim 7, wherein the condensed representation is stored in a memory location.

10. The method of claim 7, wherein the condensed representation uses $\log_n 2$ bits to encode a path for each n-way branch in the program.

11. The method of claim 7, wherein the size of the condensed representation for any path makes use of an expected frequency with which that path is taken.

12. The method of claim 7, wherein the condensed representation uses path encoding.

13. The method of claim 7, further comprising:

expanding the condensed representation by storing the individual block identifiers contained therein into the sequence record.

14. The method of claim 1, wherein recording the sequence information into the sequence record comprises storing the sequence information in memory.

15. The method of claim 14, wherein the sequence record is stored in a region of memory separate from where the program is stored.

16. The method of claim 14, wherein the sequence record is stored in a circular buffer.

17. The method of claim 16, wherein the buffer size is dynamically set.

18. The method of claim 14, wherein the program comprises plural programs/subprograms, and wherein separate regions of memory are maintained, each region being associated with a program/subprogram for storing therein part of the sequence record corresponding to the associated program/subprogram.

19. The method of claim 1, wherein recording the sequence information into the sequence record comprises storing the sequence information to a file.

20. The method of claim 1 wherein the program's source code is instrumented.

21. The method of claim 1 wherein instrumenting the program occurs at a link level.

22. The method of claim 1 wherein the program's binary code is instrumented.

23. The method of claim 1, further comprising:

presenting the trace record to a user.

24. The method of claim 23, wherein the trace record is presented in the form of assembly code.

25. The method of claim 23, wherein the trace record is presented in the form of source level code.

26. The method of claim 25 further comprising:

maintaining, for each binary-level instruction, a pointer to a line of source code from which the binary-level instruction was generated.

27. The method of claim 26, wherein the pointer is determined from a compiler listing file.

28. The method of claim 26, further comprising:

filtering out repeat source level instructions.

29. The method of claim 1, further comprising:

presenting a summary of the trace record to a user.

30. The method of claim 29, wherein presenting a summary further comprises:

presenting basic block lines identified in the trace record.

31. The method of claim 29, wherein presenting a summary further comprises:
   presenting procedure calls identified in the trace record.

32. The method of claim 29, wherein presenting a summary further comprises:
   presenting inter-module or inter-program calls identified in the trace record.

33. The method of claim 1, further comprising:
   maintaining a table, the table comprising a plurality of entries, each entry corresponding to a program block.

34. The method of claim 33, wherein each entry is addressed by a hash of its corresponding block's program counter.

35. The method of claim 33, wherein the instrumentation code produces a last instruction trace by recording a sequence indicator when recording the block identifier.

36. The method of claim 35, wherein the sequence indicator is a time-stamp.

37. The method of claim 36, wherein the time-stamp is recorded upon entry into the corresponding block.

38. The method of claim 36, wherein the time-stamp is recorded upon exit from the corresponding block.

39. The method of claim 35, wherein the sequence indicator is a counter value, further comprising:
   incrementing the counter value after recording its value.

40. The method of claim 39, further comprising:
   maintaining a separate counter for each module, subprogram or procedure.

41. The method of claim 39, wherein when the counter value reaches a preset limit, a time-stamp is recorded in place of the counter value.

42. The method of claim 33, wherein the instrumentation code produces a first instruction trace by recording a sequence indicator for a corresponding block only the first time the block is executed.

43. The method of claim 1, wherein sequence information is stored only when a specified event is detected by the instrumentation code.

44. The method of claim 43, wherein the specified event is selected by a user.

45. The method of claim 1, wherein an application comprises multiple programs, wherein presenting the instruction trace to a user further comprises:
   displaying, in the trace record, a program name corresponding to an instruction trace entry.

46. The method of claim 1, further comprising:
   storing any or all of a crash instruction trace, a first instruction trace, and a last instruction trace.

47. A computer memory configured for back-tracing execution of a computer program, said computer program comprising a plurality of identified blocks, comprising:
   a trace record instrumenter for instrumenting an original version of the program by adding instrumentation code to identified blocks to form an instrumented program, the instrumentation code recording execution sequence information upon execution of the corresponding instrumented block, such that cumulative sequence information recorded during execution of the program forms a sequence record;
   a post-processor for transforming, upon occurrence of a triggering event, the sequence record recorded during an execution of the program into a trace record, wherein sequence information in the sequence record is transformed into at least one program counter value of an instruction within an instrumented block whose execution caused the sequence information to be recorded; and
   a trace record presenter for presenting the trace record.

48. The computer memory of claim 47, wherein the execution sequence information for each block comprises a block identifier which identifies the corresponding block.

49. The computer memory of claim 48, wherein a block identifier is a starting program counter of the corresponding block.

50. The computer memory of claim 48, wherein the post-processor generates a detailed trace record by replacing each recorded block identifier with program counters associated with each instruction in the corresponding block.

51. The computer memory of claim 48, further comprising:
   recording a block identifier in a condensed representation, wherein the condensed representation holds a plurality of block identifiers.

52. The computer memory of claim 48, wherein the program may comprise several programs or subprograms, and wherein separate regions of memory are maintained, each region being associated with a program or subprogram for storing therein sequence information corresponding to the associated program or subprogram.

53. The computer memory of claim 48, wherein the trace record instrumenter instruments the program's source code.

54. The computer memory of claim 48, wherein the trace record instrumenter instruments the program's binary code.

55. The computer memory of claim 47, wherein the trace record presenter presents the trace record in the form of assembly code.

56. The computer memory of claim 47, wherein the trace record presenter presents the trace record in the form of source level code.

57. The computer memory of claim 56, further comprising:
   for each binary-level instruction, a pointer to a line of source code from which the binary-level instruction was generated.

58. The computer memory of claim 57, wherein each pointer is determined from a compiler listing file.

59. The computer memory of claim 47, wherein the trace record presenter presents a summary of the sequence information.

60. The computer memory of claim 59, wherein the summary comprises procedure calls identified in the sequence information.

61. The computer memory of claim 59, wherein the summary comprises inter-module or inter-program calls identified in the sequence information.

62. The computer memory of claim 47, further comprising:
   a table comprising a plurality of entries, each entry corresponding to a program block.

63. The computer memory of claim 62, wherein the instrumented code produces a last instruction trace by recording a sequence indicator when recording the block identifier.

64. The computer memory of claim 63, wherein the sequence indicator is a time-stamp.

65. The computer memory of claim 64, wherein the time-stamp is recorded upon entry into the corresponding block.

66. The computer memory of claim 63, further comprising:
   a counter whose current value is taken as the sequence indicator, wherein the counter is incremented after its value is recorded.

67. The computer memory of claim 66, further comprising:

a separate counter for each module, subprogram or procedure.

68. The computer memory of claim 66, wherein when the counter value reaches a preset limit, a time-stamp is recorded in place of the counter's value.

69. The computer memory of claim 62, wherein the instrumented code produces a first instruction trace by recording a sequence indicator for a corresponding block only the first time the block is executed.

70. The computer memory of claim 47, wherein sequence indicators are stored only when a specified event is detected by the instrumented code.

71. The computer memory of claim 47, wherein an application comprises multiple programs, such that, for each line displayed, the trace record presenter presents, in the trace record, a program name corresponding to an instruction trace entry.

72. The computer memory of claim 47, wherein the post-processor is triggered by a specified event.

73. The computer memory of claim 72, wherein the specified event occurs when the instrumented code detects a designated condition.

* * * * *

UNITED STATES PATENT AND TRADEMARK OFFICE
CERTIFICATE OF CORRECTION

PATENT NO. : 6,353,924 B1
DATED : March 5, 2002
INVENTOR(S) : Andrew E. Ayers Anant Agarwal and Richard Schooler It is certified that error appears in the above-identified patent and that said Letters Patent is hereby corrected as shown below:

<u>Column 14,</u>
Lines 22 and 24, delete "claim 48" and insert -- claim 47 --.

Signed and Sealed this

Fourteenth Day of May, 2002

*Attest:*

JAMES E. ROGAN
*Attesting Officer*    *Director of the United States Patent and Trademark Office*